(12) United States Patent
Takahashi

(10) Patent No.: US 10,754,431 B2
(45) Date of Patent: Aug. 25, 2020

(54) INFORMATION PROCESSING DEVICE AND INFORMATION PROCESSING METHOD

(71) Applicant: SONY CORPORATION, Tokyo (JP)

(72) Inventor: Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/774,434

(22) PCT Filed: Nov. 4, 2016

(86) PCT No.: PCT/JP2016/082874
§ 371 (c)(1),
(2) Date: May 8, 2018

(87) PCT Pub. No.: WO2017/094443
PCT Pub. Date: Jun. 8, 2017

(65) Prior Publication Data
US 2018/0329502 A1 Nov. 15, 2018

(30) Foreign Application Priority Data
Nov. 30, 2015 (JP) .................................. 2015-233340

(51) Int. Cl.
*G06F 3/0346* (2013.01)
*G06F 3/01* (2006.01)
(Continued)

(52) U.S. Cl.
CPC .............. *G06F 3/017* (2013.01); *G06F 1/163* (2013.01); *G06F 1/1694* (2013.01); *G06F 3/016* (2013.01);
(Continued)

(58) Field of Classification Search
CPC ........ G06F 3/017; G06F 3/016; G06F 3/0346; G06F 3/0484; G06F 3/04883; G06F 2203/04808; G06F 1/163
See application file for complete search history.

(56) References Cited

U.S. PATENT DOCUMENTS

| | | |
|---|---|---|
| 2015/0015507 A1 | 1/2015 | Yoshida |
| 2016/0018900 A1* | 1/2016 | Tu .......................... G06F 1/3234 345/156 |

(Continued)

FOREIGN PATENT DOCUMENTS

| | | |
|---|---|---|
| JP | 2010-271994 A | 12/2010 |
| JP | 2012-008772 A | 1/2012 |
| JP | 2015-018325 A | 1/2015 |

OTHER PUBLICATIONS

International Search Report and Written Opinion of PCT Application No. PCT/JP2016/082874, dated Dec. 27, 2016, 7 pages Of ISRWO.

*Primary Examiner* — Robert J Michaud
(74) *Attorney, Agent, or Firm* — Chip Law Group

(57) ABSTRACT

An information processing device includes an acquisition unit that acquires manipulation information based on a gesture manipulation of a user and a determination unit that determines that processing is to be performed on a basis of the manipulation information. The determination unit determines that first processing is to be performed in a case where first manipulation information based on a first user manipulation is acquired, and that the first processing is to be performed, on a basis of acquired usage information of the user, in a case where second manipulation information based on a second user manipulation related to the first user manipulation is acquired.

20 Claims, 16 Drawing Sheets

(51) Int. Cl.
*G06F 1/16* (2006.01)
*G06F 3/0488* (2013.01)
*G06F 3/0484* (2013.01)

(52) U.S. Cl.
CPC .......... *G06F 3/0346* (2013.01); *G06F 3/0484* (2013.01); *G06F 3/04883* (2013.01); *G06F 2203/04808* (2013.01)

(56) References Cited

U.S. PATENT DOCUMENTS

2016/0299570 A1* 10/2016 Davydov ................ G06F 1/163
2017/0063852 A1* 3/2017 Azar ....................... G06F 21/32

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/082874 filed on Nov. 4, 2016, which claims priority benefit of Japanese Patent Application No. JP 2015-233340 filed in the Japan Patent Office on Nov. 30, 2015. Each of the above-referenced applications is hereby incorporated herein by reference in its entirety.

TECHNICAL FIELD

The present disclosure relates to an information processing device, an information processing method, and a program.

BACKGROUND ART

Conventionally, for example, in Patent Literature 1 below, a technology that assumes performing appropriate gesture feedback using gesture prediction information has been described.

CITATION LIST

Patent Literature

Patent Literature 1: JP 2012-8772A

DISCLOSURE OF INVENTION

Technical Problem

A motion recognition gesture in a watch-type terminal or other wearable terminals enables manipulation without a user directly manipulating a button or a touch panel of the terminal, and can provide the user with convenience. However, in the case where the user's motion is smaller than assumed, manipulation cannot be carried out in some cases. On the other hand, there is a problem in that relaxing a gesture recognition condition increases cases in which a gesture is recognized even in a situation in which a gesture is not intended to be recognized, leading to a decrease in convenience and satisfaction for the user.

In addition, in the case where the user's motion is similar to an assumed gesture but is not recognized as a gesture, it seems that the user is highly likely to have desired gesture recognition, but under present circumstances, the only way to cause gesture recognition is to try the same gesture again.

In addition, the user uses the terminal in various situations, and there is a problem in that uniformly applying a gesture recognition condition makes it difficult to perform gesture recognition in accordance with a situation, leading to a decrease in the user's convenience.

Hence, there have been demands that a user's convenience be enhanced by gesture recognition with high precision in accordance with a user's usage situation.

Solution to Problem

According to the present disclosure, there is provided an information processing device including: an acquisition unit configured to acquire manipulation information based on a gesture manipulation of a user; and a determination unit configured to determine that processing is to be performed on a basis of the manipulation information. The determination unit determines that first processing is to be performed in a case where first manipulation information based on a first user manipulation is acquired, and that the first processing is to be performed, on a basis of acquired usage information of the user, in a case where second manipulation information based on a second user manipulation related to the first user manipulation is acquired.

In addition, according to the present disclosure, there is provided an information processing method including: acquiring manipulation information based on a gesture manipulation of a user; and determining that processing is to be performed on a basis of the manipulation information. It is determined that first processing is to be performed in a case where first manipulation information based on a first user manipulation is acquired, and that the first processing is to be performed, on a basis of acquired usage information of the user, in a case where second manipulation information based on a second user manipulation related to the first user manipulation is acquired.

In addition, according to the present disclosure, there is provided a program causing a computer to function as: a means of acquiring manipulation information based on a gesture manipulation of a user; and a means of determining that processing is to be performed on a basis of the manipulation information. The program causes the computer to function as a means of determining that first processing is to be performed in a case where first manipulation information based on a first user manipulation is acquired, and that the first processing is to be performed, on a basis of acquired usage information of the user, in a case where second manipulation information based on a second user manipulation related to the first user manipulation is acquired.

Advantageous Effects of Invention

According to the present disclosure, gestures can be recognized with high precision without impairment of a user's convenience.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
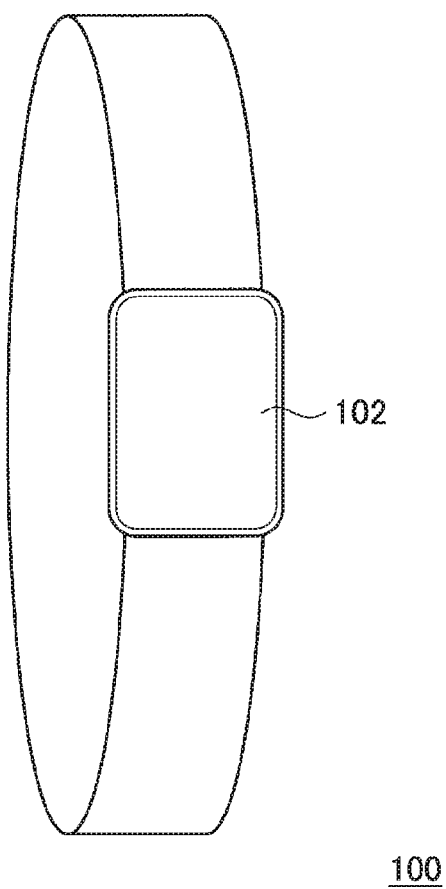
FIG. 1 is a schematic diagram illustrating an appearance of a terminal device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. First Embodiment
1.1. Example of appearance of terminal device
1.2. Functional configuration of terminal device
1.3. Typical example of gesture triggering
1.4. Processing of gesture triggering
1.5. Other examples of processing of gesture triggering
1.6. Examples of application to other devices
2. Second Embodiment
2.1. Changing gesture recognition function according to manipulation history of user
2.2. Changing gesture recognition function according to notification
2.3. Changing LP filter according to activity of user 1. First Embodiment

[1.1. Example of Appearance of Terminal Device]

FIG. 1 is a schematic diagram illustrating an appearance of a terminal device 100 according to an embodiment of the present disclosure. This terminal device 100 is configured as a watch-type device including a display unit 102 (display) and a sensor such as an acceleration sensor, and has a website viewing function, an e-mail function, a function of listening to and watching music, moving images, etc., a position detection function using a GPS or the like, a navigation function, and the like, like a smartphone, a table terminal, etc.

The terminal device 100 constantly senses a value of the sensor such as an acceleration sensor, applies the value of the sensor to a gesture determination function (gesture determination condition), and decides triggering/non-triggering of a gesture according to the result. As the most common example of a gesture, a screen is lit when an arm is swung up. Other examples include gestures such as twisting an arm and tapping an index finger and a middle finger.

[1.2. Functional Configuration of Terminal Device]

Figure 2:
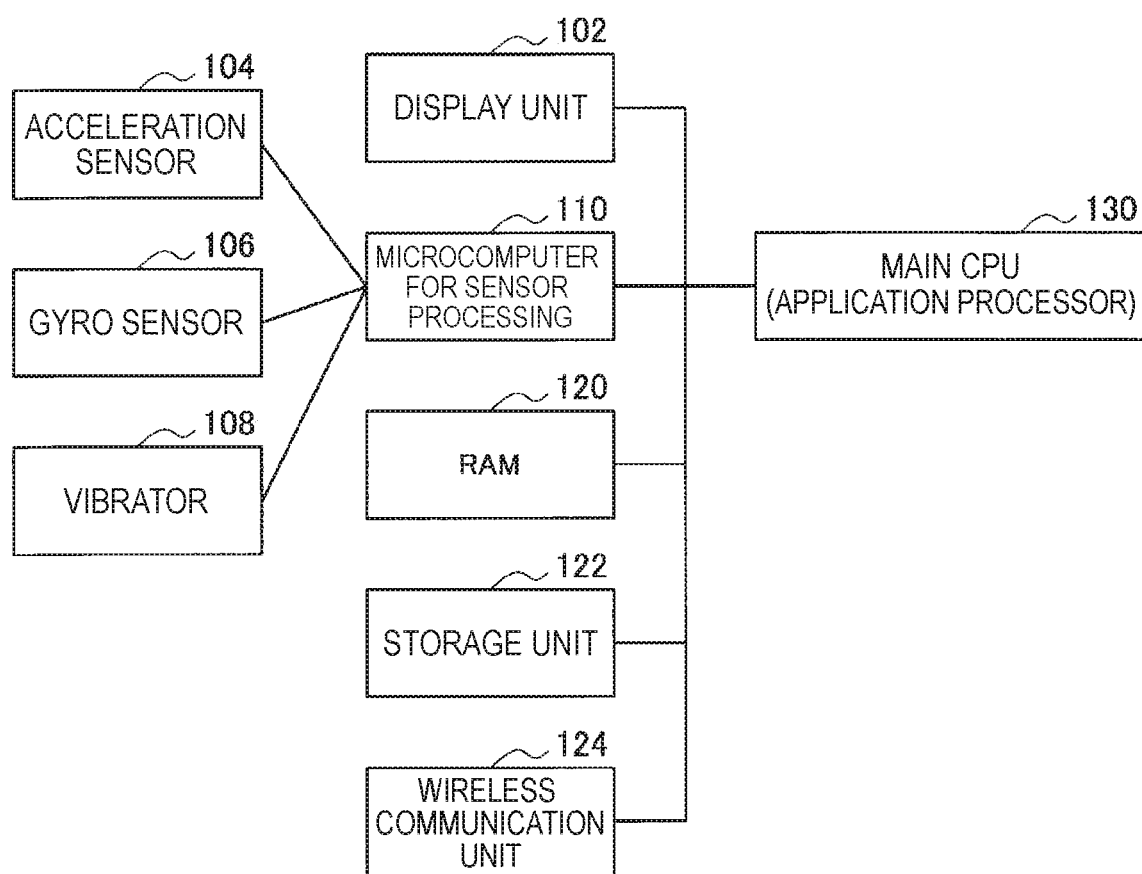
FIG. 2 is a block diagram illustrating a functional configuration of a terminal device.

FIG. 2 is a block diagram illustrating a functional configuration of the terminal device 100. As illustrated in FIG. 2, the terminal device 100 includes, in addition to the display unit (reporting unit) 102, an acceleration sensor 104, a gyro sensor 106, a vibrator (reporting unit) 107, a microcomputer 110, a RAM 120, a storage (storage unit) 122, a wireless connection unit (wireless communication unit) 124, and a main CPU 130. The terminal device 100 can connect to a master smartphone or directly connect to the Internet, via the wireless connection unit 124.

The acceleration sensor 104 and the gyro sensor 106 are once connected to the microcomputer 110 for sensor processing, and then connected to the main CPU 130 (application processor) that performs main processing. The microcomputer 110 for sensor processing may perform simple gesture discrimination.

While the terminal device 100 is running, the main CPU 130 functions as an application processor, and executes the website viewing function, the e-mail function, the function of listening to and watching music, moving images, etc., the position detection function using a GPS or the like, the navigation function, and the like, which are mentioned above. On the other hand, in the terminal device 100, in the case where there is no user manipulation for a certain period of time, power is turned off by time-up or the like, and the microcomputer 110 constantly senses detection values of the acceleration sensor 104 and the gyro sensor 106. Then, the detection values of these sensors are applied to a gesture determination function, and triggering/non-triggering of a gesture is decided according to the result. Since the microcomputer 110 consumes significantly less power than the main CPU 130, power consumption can be significantly reduced by stopping the main CPU 130 and keeping only the microcomputer 110 running when the power is off.

[1.3. Typical example of gesture triggering]

When a gesture is triggered on the basis of a detection value of a sensor while the power of the terminal device 100 is off, the power of the terminal device 100 is turned on, and a display screen of the display unit 102 is lit. FIGS. 3A, 3B, 3C, and 3D are schematic diagrams illustrating an example in which the display screen of the display unit 102 is lit when an arm is swung up, as the most common example of a gesture.

Here, as basic operation, the display screen is lit in the case where a detection value of the acceleration sensor 104 when an arm is swung up is larger than a determination value of a gesture for lighting a screen. On the other hand, in the case where the user tries to light the display screen but the detection value of the sensor does not reach the determination value, having the user perform the same action again requires an action troublesome for the user and leads to a decrease in convenience. Therefore, in the present embodiment, when a detection value of a sensor when an arm is swung up is slightly smaller than a determination value of a gesture for lighting a screen, the screen is lit when the user moves a wrist slightly and then stops the movement. This operation is illustrated in FIGS. 3A, 3B, 3C, and 3D.

Figure 3A:
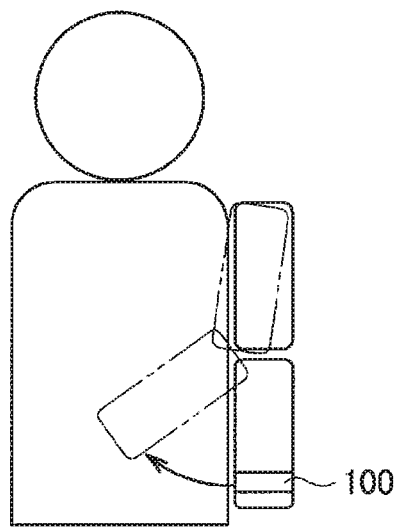
FIG. 3A is a schematic diagram illustrating an example in which a display screen of a display unit 102 is lit when an arm is swung up.
Figure 3B:
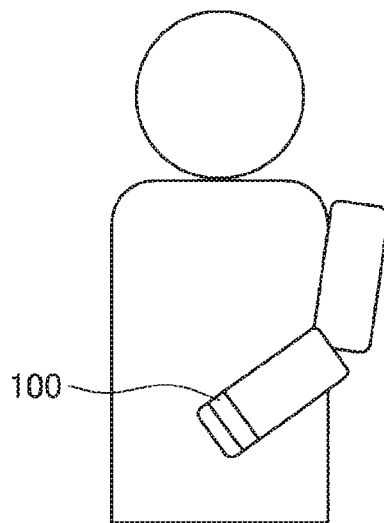
FIG. 3B is a schematic diagram illustrating an example in which a display screen of a display unit is lit when an arm is swung up.
Figure 3C:
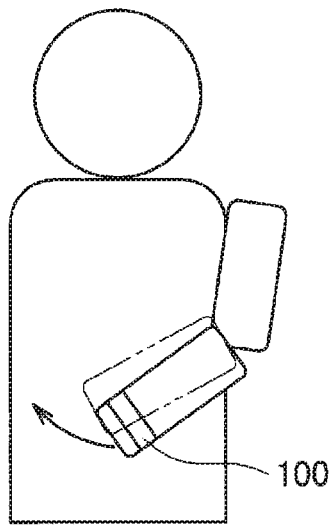
FIG. 3C is a schematic diagram illustrating an example in which a display screen of a display unit is lit when an arm is swung up.
Figure 3D:
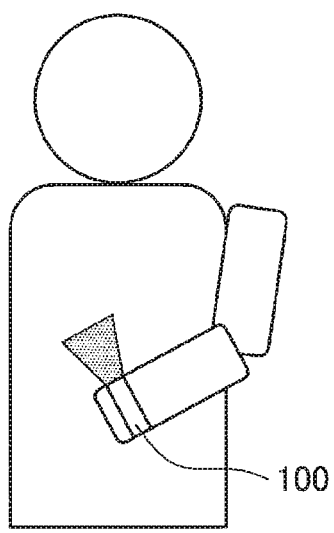
FIG. 3D is a schematic diagram illustrating an example in which a display screen of a display unit is lit when an arm is swung up.

First, as illustrated in FIG. 3A, the user swings up the terminal device 100 to try triggering of a gesture, but the terminal device 100 is not swung up enough, and the screen is not lit as illustrated in FIG. 3B, and the gesture is not triggered. In this case, by the user performing an additional small gesture of bringing the terminal device 100 closer to the user as illustrated in FIG. 3C, the display screen of the display unit 102 is lit as illustrated in FIG. 3D, and the user can achieve a desired operation of lighting of the display screen by the gesture.

In FIGS. 3A, 3B, 3C, and 3D, first, second, and third determination conditions (gesture triggering conditions) are described. The first determination condition, the second determination condition, and the third determination condition allow, respectively, invocation (triggering) by swinging up of an arm, swinging up of an arm on a condition more relaxed than the first determination condition, and changing an angle of an arm or lightly shaking the arm in a state where the arm is swung up. In addition, in a finger tap manipulation, the first determination condition is a manipulation of tapping an index finger and a middle finger, the second determination condition is detection of a tap manipulation on a condition more relaxed than the first determination condition, and the third determination condition is tap detection on a condition that is stricter than the second determination condition but more relaxed than the first determination condition. Note that a tap manipulation will be described later.

According to processing illustrated in FIGS. 3A, 3B, 3C, and 3D, in the case where the user tries to light the display screen by a gesture, and the gesture is not triggered because an arm swing-up amount is small, the gesture can be triggered by performing an additional action. Thus, in the case where a gesture is not triggered, the user can trigger the gesture with a small action without swinging up the arm again.

On the other hand, when a determination value of a gesture for lighting a screen is made small, the gesture can be triggered even in the case where an arm swing-up amount is small. However, in this case, the gesture is assumed to be triggered even in the case where the user does not intend to trigger the gesture, such as when the user holds a strap in a train, for example.

Hence, a technique of the present embodiment can reliably suppress unintended gesture triggering and, in the case where a gesture is not triggered, reliably trigger the gesture with an additional action.

[1.4. Processing of Gesture Triggering]

Figure 4:
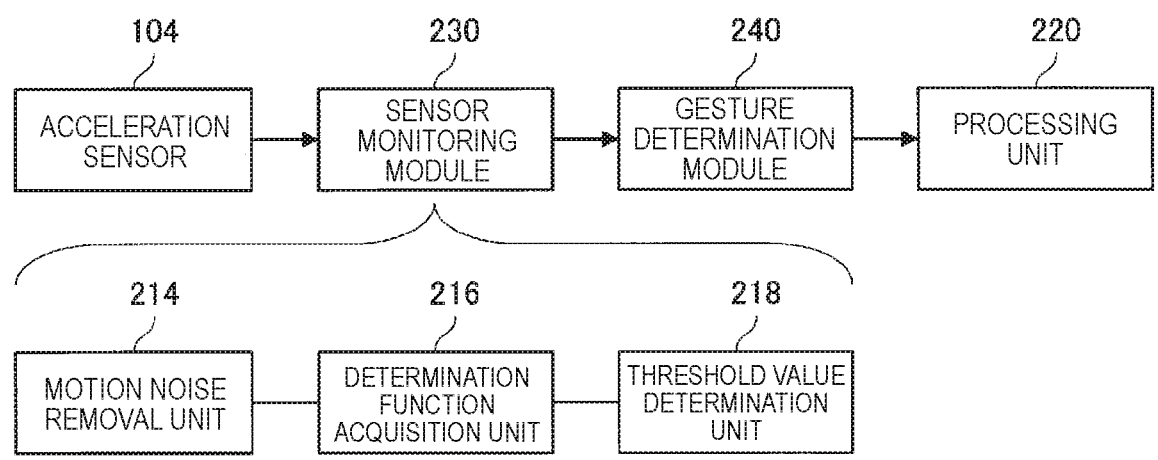
FIG. 4 is a block diagram illustrating a functional configuration implemented by a microcomputer for gesture triggering.

FIG. 4 is a block diagram illustrating a functional configuration implemented by the microcomputer 110 for gesture triggering. As illustrated in FIG. 4, as a configuration for gesture triggering, the acceleration sensor 104, a sensor monitoring module 230, a gesture determination module 240, and a display module (processing unit) 220 are included.

In the example illustrated in FIG. 4, a sensor value of the acceleration sensor 104 is processed by the sensor monitoring module 230. The sensor monitoring module 230 performs only relatively simple processing, and can operate with low power consumption. In addition, the gesture determination module 240 is started up and caused to perform processing as necessary. In the case where a motion is detected by the sensor monitoring module 230, the gesture determination module 240 performs gesture determination, and in the case where the motion is recognized as a gesture, the processing unit 220 performs notification to the display module and various applications.

Processing of the sensor monitoring module 230 can be divided into a motion noise removal unit 214, a determination function acquisition unit 216, and a threshold value determination unit 218. First, three-dimensional input from the acceleration sensor 104 is subjected to noise removal by the motion noise removal unit 214, and is converted to a one-dimensional value such as norm calculation by the determination function acquisition unit 216. Furthermore, comparison with a threshold value is performed by the threshold value determination unit 218, and in the case where a threshold value condition is satisfied, the gesture determination module 240 is started up to perform detailed processing. An example of the motion noise removal unit 214 is a low-pass filter (LPF), and removes a high-frequency component (motion noise) such as noise from a detection value of the acceleration sensor 104. Structural elements illustrated in FIG. 4 can be configured using a circuit (hardware), or the microcomputer 110 and a program (software) for causing it to function. The motion noise removal unit 214 includes a low-pass filter (LPF), for example.

Figure 5:
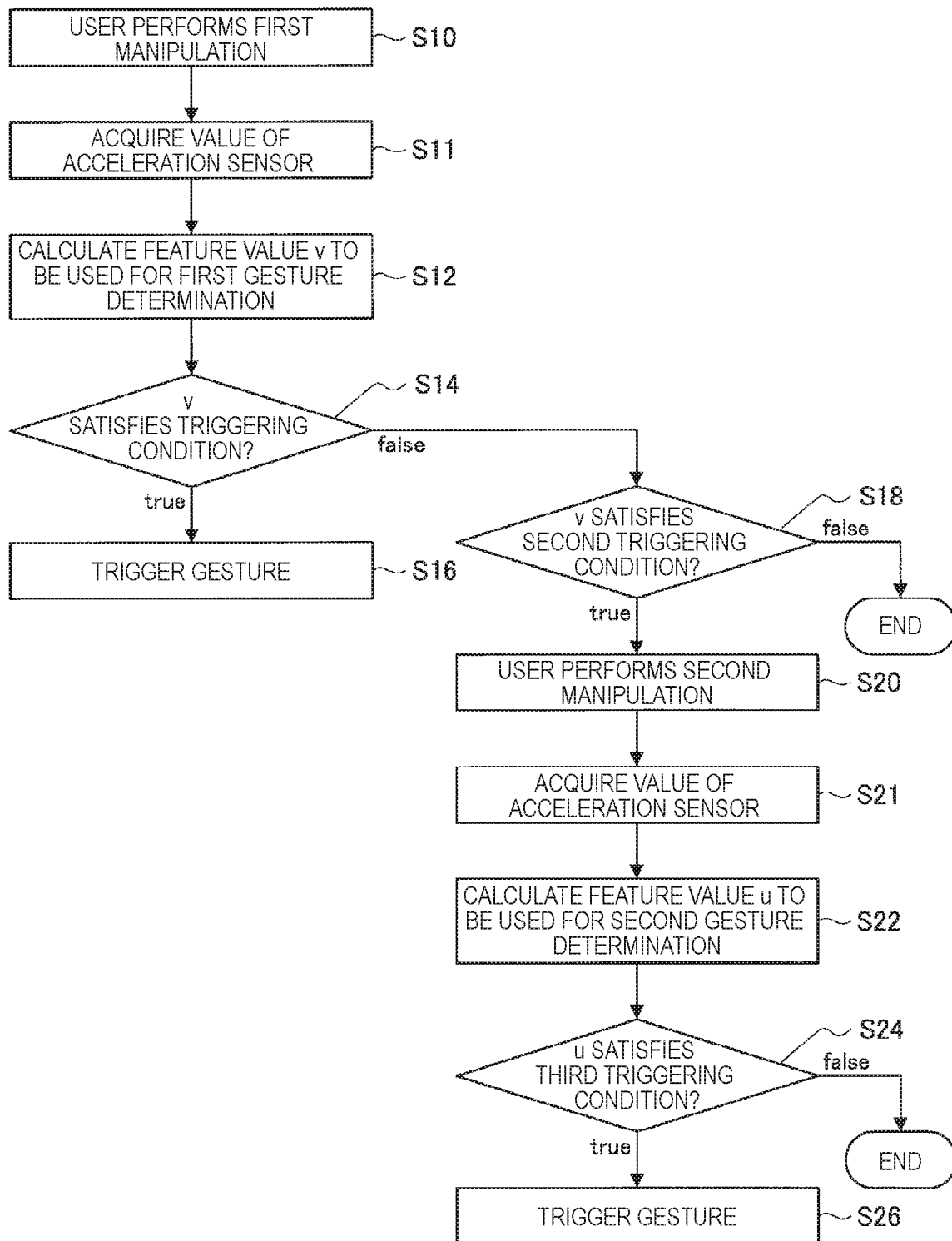
FIG. 5 is a flowchart illustrating processing for implementing the processing illustrated in FIGS. 3A, 3B, 3C, and 3D.

FIG. 5 is a flowchart illustrating processing for implementing the processing illustrated in FIGS. 3A, 3B, 3C, and 3D. The processing illustrated in FIG. 5 is mainly performed in the microcomputer 110. First, in step S10, the user performs a first manipulation. Here, the first manipulation corresponds to an action of swinging up an arm. Next, in step S11, a detection value of the acceleration sensor 104 is acquired. In next step S12, a feature value v to be used for first gesture determination is calculated. In next step S14, it is determined whether the feature value v satisfies a gesture triggering condition, and in the case where the gesture triggering condition is satisfied, the processing advances to step S16 and a gesture is triggered.

Figure 6:
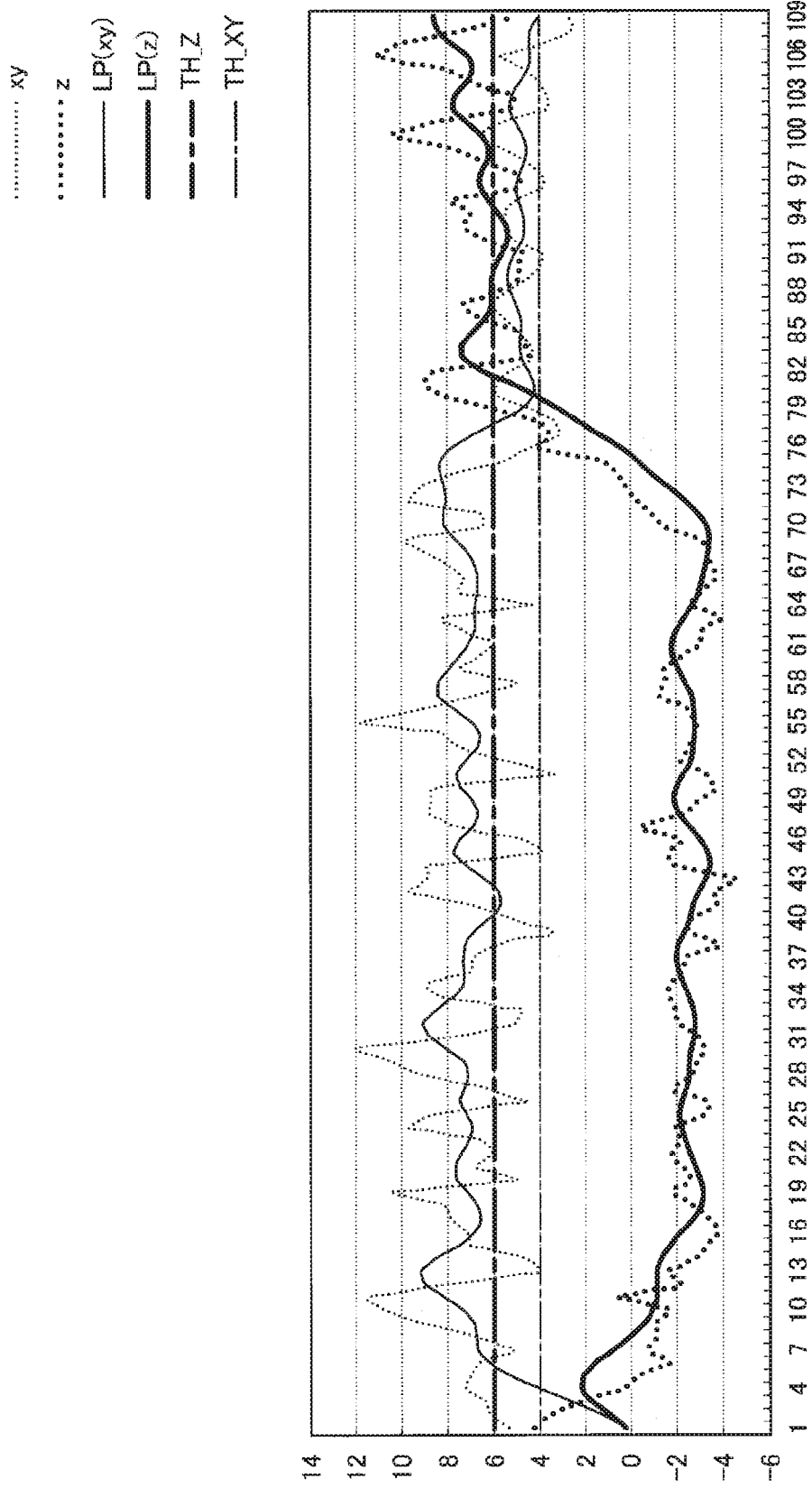
FIG. 6 is a characteristic diagram illustrating the relationship between a detection value of an acceleration sensor and a feature value v.

FIG. 6 is a characteristic diagram illustrating the relationship between a detection value of the acceleration sensor 104 and the feature value v. In FIG. 6, characteristics indicated by two types of broken lines indicate sensor values of the acceleration sensor 104, and indicate an acceleration xy in an xy-axis direction and an acceleration z in a z-axis direction. A sensor value acquisition unit 212 acquires the characteristics indicated by the broken lines in FIG. 6 in step S11 of FIG. 5. Characteristics indicated by two types of solid lines (a thick line and a thin line) in FIG. 6 indicate sensor values of the acceleration sensor 104 after noise removal by the motion noise removal unit 214; the thin line indicates a sensor value LP(xy) in the xy-axis direction, and the thick line indicates a sensor value LP(z) in the z-axis direction. The determination function acquisition unit 216 acquires the characteristics indicated by the solid lines in FIG. 6, which have been subjected to removal of a high-frequency component such as noise by the motion noise removal unit 214 and converted to one-dimensional values, in step S12 of FIG. 5. The characteristics indicated by the solid lines in FIG. 6 correspond to the feature value v.

In addition, in FIG. 6, characteristics indicated by two types of dot-dash lines indicate threshold values for determining the characteristics indicated by the solid lines, and indicate a threshold value TH_xy for determining characteristics in the xy-axis direction and a threshold value TH_z for determining characteristics in the z-axis direction. The threshold value determination unit 218 compares the characteristics LP(xy), LP(z) indicated by the solid lines in FIG. 6 with the threshold values TH_xy, TH_z, and determines whether the gesture triggering condition is satisfied on the basis of whether the values of the characteristics LP(xy), LP(z) exceed the threshold values TH_xy, TH_z in step S14 of FIG. 5. It is possible to determine whether the first manipulation (the manipulation of swinging up the terminal device 100) satisfies the gesture triggering condition by setting the threshold values TH_xy, TH_z to desired values in advance and registering them. When it is determined that the gesture triggering condition is satisfied by the threshold value determination unit 218, the processing unit 220 performs gesture triggering processing. In addition, when the gesture triggering condition is satisfied, the processing unit 220 performs processing of changing the state of an application and outputting information indicating that the triggering condition has been satisfied.

In the case where the feature value v does not satisfy the gesture triggering condition in step S14 of FIG. 5, the processing advances to step S18. In step S18, it is determined whether the feature value v satisfies a second triggering condition, and in the case where the second triggering condition is satisfied, the processing advances to step S20. The second triggering condition is a condition for detecting a gesture similar to the first triggering condition, and is a condition more relaxed than the first triggering condition. Alternatively, the second triggering condition may be a condition for detecting a gesture different from the first triggering condition. On the other hand, in the case where the second triggering condition is not satisfied in step S18, the processing is ended. In step S18, the threshold value determination unit 218 performs determination using threshold values of a more relaxed determination condition than the threshold values TH_xy, TH_z.

In next step S20, when the user performs a second manipulation, a detection value of the acceleration sensor 104 is acquired in next step S21. Here, the second manipulation corresponds to a gesture of bringing the terminal device 100 closer to the user as illustrated in FIG. 3C. After step S21, the processing advances to step S22, and a feature value u to be used for second gesture determination is calculated. Like the feature value v, the feature value u corresponds to the characteristics LP(xy), LP(z) indicated by the solid lines in FIG. 6.

In next step S24, it is determined whether the feature value u satisfies a third triggering condition, and in the case where the third triggering condition is satisfied, the processing advances to step S26 and a gesture is triggered. A gesture satisfying the third triggering condition is an additional small gesture of bringing the terminal device 100 closer to the user as illustrated in FIG. 3C, for example. On the other hand, in the case where the third triggering condition is not satisfied in step S24, the processing is ended.

In step S24, the threshold value determination unit 218 performs determination using threshold values different from the threshold values TH_xy, TH_z. The gesture of bringing the terminal device 100 closer to the user as illustrated in FIG. 3C can be detected by setting a threshold value TH_xy for determining characteristics in the xy-axis direction and a threshold value TH_z for determining characteristics in the z-axis direction to desired values in advance and registering them.

In the processing of FIG. 5, gesture determination for the first manipulation is performed on the basis of the feature value v, and in the case where the feature value v does not satisfy the first normal triggering condition (step S14), the second triggering condition is checked (step S18). The second triggering condition is a condition more relaxed than the first triggering condition, and the second triggering condition allows triggering in all cases where the first triggering condition allows triggering. In addition, a motion that is similar to the first triggering condition but does not satisfy the first triggering condition also triggers the second triggering condition. In other words, the second triggering condition is a more relaxed condition that includes the first triggering condition. In the case where the feature value v satisfies the second triggering condition, subsequent values of the acceleration sensor 104 are detected (step S21), and in the case where the user tries an additional gesture, evaluation is performed using a third triggering condition different from the first triggering condition (step S24), and in the case where this is satisfied, a gesture is triggered (step S26).

Consequently, in the case where an action that the user has performed for gesture triggering (swinging up an arm) does not satisfy the first triggering condition but satisfies the second triggering condition more relaxed than the first triggering condition, an additional simple gesture is evaluated using the third triggering condition. Then, in the case where the additional gesture satisfies the third triggering condition, a gesture is triggered. Thus, in the case where the user tries to trigger a gesture, and an arm swing-up amount is too small to trigger the gesture, the gesture can be reliably triggered by performing an additional gesture. Note that in the case where an action that the user has performed for gesture triggering (swinging up an arm) satisfies the second triggering condition, a gesture is triggered in the case where an additional gesture is performed at the same time as the action that the user has performed for gesture triggering (swinging up an arm) or within a predetermined period of time from the action that the user has performed for gesture triggering. In this case, there is assumed to be a time lag between the execution of the action that the user has performed for gesture triggering (swinging up an arm) and the actual acquisition of its action information, or a time lag between the execution of the additional gesture and the actual acquisition of its action information. Therefore, a case where manipulation information of swinging up of an arm and manipulation information of an additional gesture are acquired at the same time and a case where they are acquired at different timings can both be assumed.

[1.5. Other Examples of Processing of Gesture Triggering]

Figure 7:
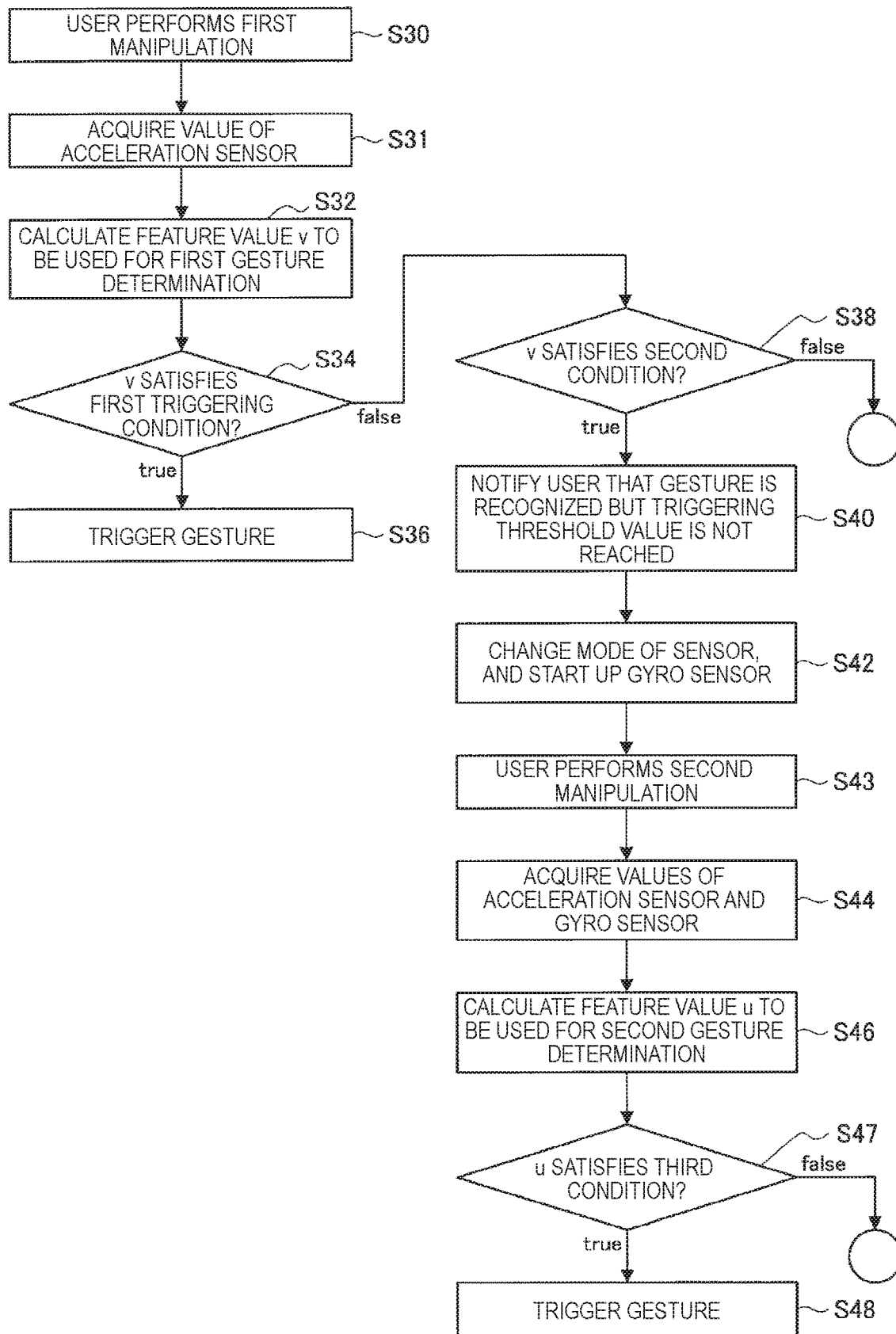
FIG. 7 is a flowchart illustrating an example in which in the case where an action that a user has performed for gesture triggering (swinging up an arm) does not satisfy a first triggering condition but satisfies a second triggering condition more relaxed than the first triggering condition, information indicating that is displayed on a terminal device.

FIG. 7 is a flowchart illustrating an example in which in the case where an action that the user has performed for gesture triggering (swinging up an arm) does not satisfy the first triggering condition but satisfies the second triggering condition more relaxed than the first triggering condition, information indicating that is displayed on the terminal device 100. In addition, FIG. 7 illustrates an example in which in the case where an action that the user has performed for gesture triggering (swinging up an arm) does not satisfy the first triggering condition but satisfies the second triggering condition more relaxed than the first triggering condition, the gyro sensor 106 is started up and a triggering condition is relaxed.

First, in step S30, the user performs a first manipulation. Here, the first manipulation corresponds to an action of swinging up an arm. Next, in step S31, a detection value of the acceleration sensor 104 is acquired. In next step S32, a feature value v to be used for first gesture determination is calculated. In next step S34, it is determined whether the feature value v satisfies a gesture triggering condition, and in the case where the gesture triggering condition is satisfied, the processing advances to step S36 and a gesture is triggered.

On the other hand, in the case where the feature value v does not satisfy the gesture triggering condition in step S34, the processing advances to step S38. In step S38, it is determined whether the feature value v satisfies a second triggering condition, and in the case where the second triggering condition is satisfied, the processing advances to step S40. On the other hand, in the case where the second triggering condition is not satisfied in step S38, the processing is ended.

In step S40, the user is notified that a gesture is recognized but a threshold value of gesture triggering is not reached. This notification to the user can be performed by a method such as display on the display unit 102, or start-up of the vibrator 107. In other words, the display unit 102 and the vibrator 107 function as a reporting unit for prompting a second manipulation in next step S43. In addition, the notification to the user may show the user that the threshold value of gesture triggering will become smaller, by lighting a backlight of the terminal device 100 for a moment or shortly vibrating the vibrator 107. Alternatively, in the case of a finger tap gesture in screen display or a gesture manipulation on television, instead of a swing-up gesture, display prompting the user to perform manipulation again may be performed on a screen.

In next step S42, a mode of a sensor of the terminal device 100 is changed, and the gyro sensor 106 is started up. In next step S43, the user who has received the notification in step S40 performs the second manipulation. The second manipulation corresponds to a gesture of bringing the terminal device 100 closer to the user as illustrated in FIG. 3C.

In next step S44, detection values of the acceleration sensor 104 and the gyro sensor 106 are acquired.

After step S44, the processing advances to step S46, and a feature value u to be used for second gesture determination is calculated. In next step S47, it is determined whether the feature value u satisfies a third triggering condition, and in the case where the third triggering condition is satisfied, the processing advances to step S48 and a gesture is triggered. The determination whether the third triggering condition is satisfied is performed using a detection value of the gyro sensor 106, in addition to a detection value of the acceleration sensor 104. On the other hand, in the case where the third triggering condition is not satisfied in step S46, the processing is ended. In the case where the notification in step S40 has been performed, the user is more likely to perform the second manipulation; hence, a condition for determining whether the third triggering condition is satisfied may be relaxed relative to the normal condition (step S24 of FIG. 5). Thus, the gesture triggering condition can be changed dynamically.

According to the processing of FIG. 7, in the case where an action of the user (swinging up an arm) does not satisfy the first triggering condition but satisfies the second triggering condition more relaxed than the first triggering condition, notification is performed by a method such as display on the display unit 102, or driving of the vibrator 107; thus, the user is notified that the triggering condition will be relaxed. Consequently, the user can be notified that the first manipulation has failed to satisfy the first triggering condition by a narrow margin and that the triggering condition will be relaxed. The user who has received the notification can recognize that a gesture is triggered by performing an additional action, and performs the second manipulation in step S43. Thus, the gesture can be triggered by the feature value u attributed to the second manipulation satisfying the third triggering condition.

In addition, according to the processing of FIG. 7, gesture detection is performed using only the acceleration sensor 104 in normal operation, but in the case where the first manipulation of the user is similar to a swing-up action, the gyro sensor 106, which is normally not used, can also be started up to be used for detection of the next second manipulation. This can enhance the detection precision of the second manipulation, and consequently can relax requirements for gesture detection. Note that although the triggering condition in detecting the second manipulation is relaxed by using the gyro sensor 106 in combination in FIG. 7, it is also possible to relax the threshold values $TH\_xy$, $TH\_z$ themselves of the determination condition in detecting the second manipulation.

In addition, although, in the case where the first manipulation of the user is similar to a swing-up action, the gyro sensor 106 is also started up to be used for detection of the next second manipulation in the above-described example, it is also possible to enhance recognition precision in detecting the second manipulation by temporarily increasing a sampling frequency of the acceleration sensor 104 or increasing a clock of the microcomputer 110 and the main CPU 130, for example, to temporarily change a mode of the terminal device 100 or the sensor. The acceleration sensor 104 can obtain a detection value with higher precision by having its sampling frequency increased, but its power consumption is also increased. Therefore, in regard to a newly started up sensor or a once changed mode, the newly started up sensor is stopped or the mode is returned to the original mode in the case where certain time-out time elapses or a gesture is triggered in the second gesture detection.

Figure 8:
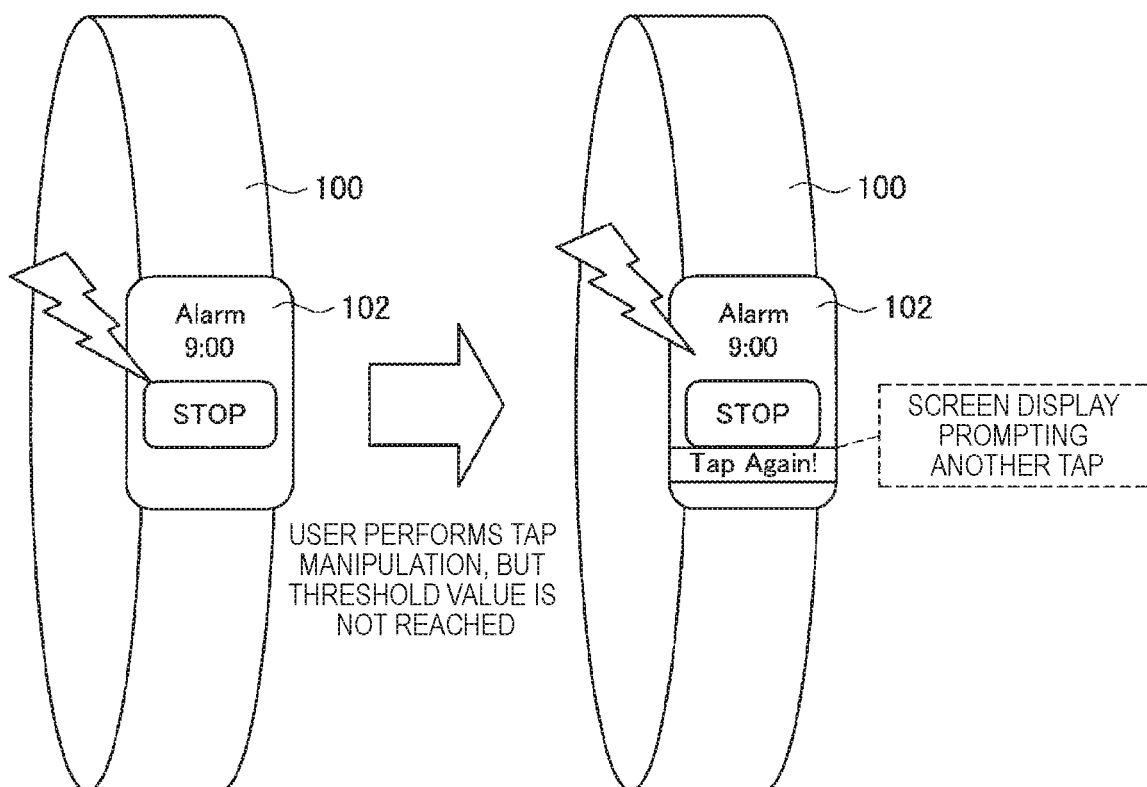
FIG. 8 is a schematic diagram illustrating an example of application to a gesture of tapping a terminal device.

Note that although an application example in the case where the user performs a gesture of swinging up an arm is described in the above-described example, the present embodiment can also be applied to a gesture of detecting that the user has tapped the terminal device 100 with a finger, in addition to a gesture of swinging up an arm. FIG. 8 is a schematic diagram illustrating an example of application to a gesture of tapping the terminal device 100, and illustrates an example in a function of stopping an alarm with a finger tap. In this example, the user performs a finger tap manipulation of tapping an index finger and a middle finger to stop the alarm, but the tap is not strong enough and the operation of stopping the alarm is not actually performed.

For example, in the case where the terminal device 100 causes an alarm to tell a time and the user performs a finger tap manipulation to stop the alarm, but the tap is too weak to cause a reaction on the first triggering condition, a system cannot determine whether this tap manipulation is an intentional manipulation; hence, if the tap satisfies the second triggering condition, it is shown on the screen of the display unit 102 that a tap has been tried, and an animation (Tap Again) prompting another tap is displayed. Furthermore, while the animation is displayed, a threshold value for detecting a tap is made lower. Thus, the user can perform the next tap easily, and, in the case where the tap satisfies the third triggering condition, the next tap can be easily detected.

On the other hand, even in the case where the tap is too weak to cause a reaction on the first triggering condition, when time-out elapses, display of the animation (Tap Again) is extinguished, and the first determination condition is applied again instead of the third determination condition that has been temporarily applied.

As well as displaying a character string as in FIG. 8, it is also possible to change a button of the terminal device 100 in color or shape or display a gesture determination function itself as a gauge to visually show the user that a slight addition is needed. In addition, in the case where the present embodiment is applied to a manipulation of moving a palm from side to side to turn the page of a menu on a screen on television or a large-screen display, display is performed as if the menu was deformed in the direction in which an arm was moved, thereby prompting the user to make a gesture again. When time-out elapses, the menu is returned from deformation.

[1.6. Examples of Application to Other Devices]

Figure 10:
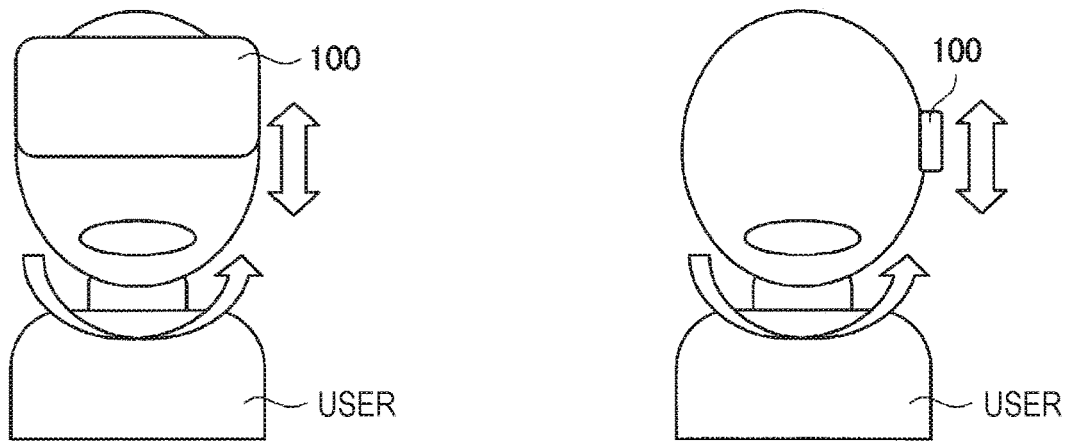
FIG. 10 is a schematic diagram illustrating an example in which the present embodiment is applied to a head-mounted display (HMD).

Although a watch-type device is exemplified as the terminal device 100 in the above-described example, the present embodiment can also be applied to a device that is worn on a head and detects a user's motion to manipulate a terminal, such as a head-mounted display or a wireless receiver. FIG. 10 is a schematic diagram illustrating an example in which the present embodiment is applied to a head-mounted display (HMD) 200. In the head-mounted display 200, an internal sensor such as an acceleration sensor, a camera, or an IR can acquire the user's gesture such as nodding or shaking one's head. The same applies to the wireless receiver. For such a gesture, processing similar to that in the watch-type device described above can be performed.

Figure 11:
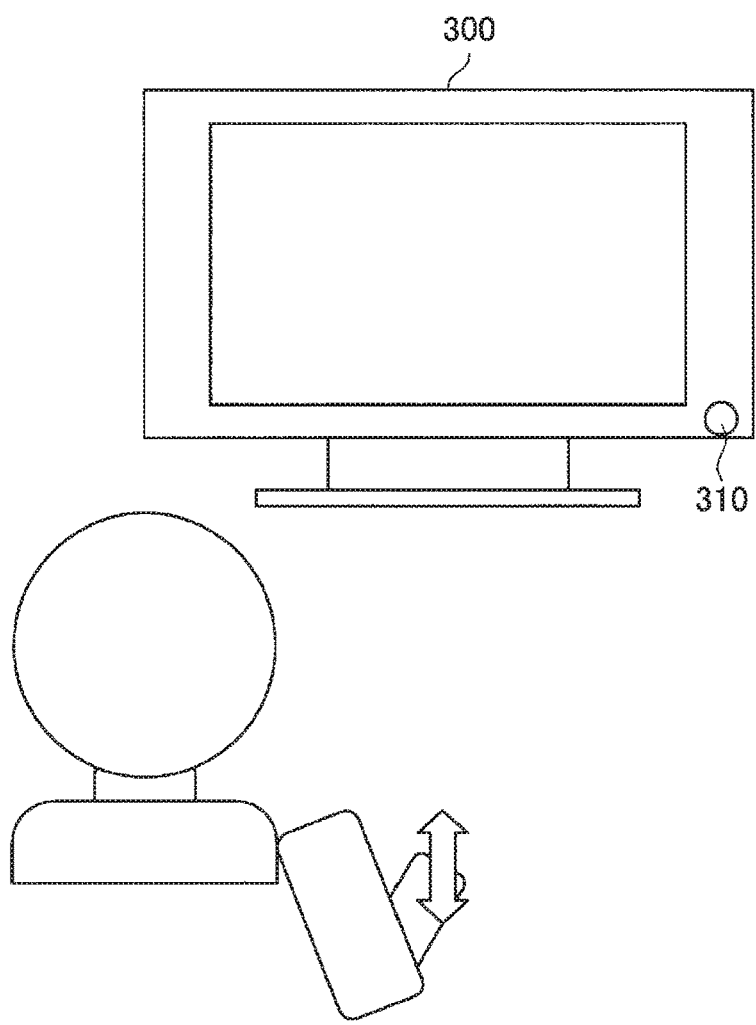
FIG. 11 is a schematic diagram illustrating an example in which, when a television receiver (TV) is manipulated, gesture recognition is performed using a camera provided in the TV or an acceleration sensor of a remote controller in a hand of a user.

FIG. 11 is a schematic diagram illustrating an example in which, when a television receiver (TV) 300 (or a projector or the like) is manipulated, gesture recognition is performed using a camera 310 provided in the TV 300 or an acceleration sensor of a remote controller in a hand of the user. In this example, the user performs a manipulation of moving the body, such as an arm, the head, and so on; thus, the camera 310 or the acceleration sensor recognizes a gesture, enabling manipulation of the TV 300. In the case where the camera 310 recognizes the gesture, in the configuration of FIG. 4, the gesture detected by the camera 310 is sent to the sensor monitoring module 230 and gesture determination is performed. Feedback to the user can be performed using a screen, sound, or lighting of the TV 300. For example, volume can be raised and lowered by a gesture of raising and lowering a palm, a menu can be selected by moving a palm from side to side, and power can be turned on/off by pointing at the screen. In addition, the present embodiment can also be applied to gesture manipulation in a game. For example, a manipulation of changing a point of view by shaking the remote controller from side to side can be made comfortable by changing a gesture triggering condition in accordance with a scene in the game. As an example of application, the point of view is made difficult to change during conversation with another player and quickly changeable during movement. Moreover, a manipulation of attacking with a weapon can be made easier when an enemy is in front, which enables the game to be played comfortably.

2. Second Embodiment

[2.1. Changing Gesture Recognition Function According to Manipulation History of User]

Next, a second embodiment of the present disclosure is described. A basic configuration of the terminal device 100 according to the second embodiment is similar to that in the first embodiment. In the second embodiment, a gesture triggering condition is changed in accordance with various situations of the terminal device 100. First, changing a gesture recognition function according to a manipulation history of the user is described.

Figure 9:
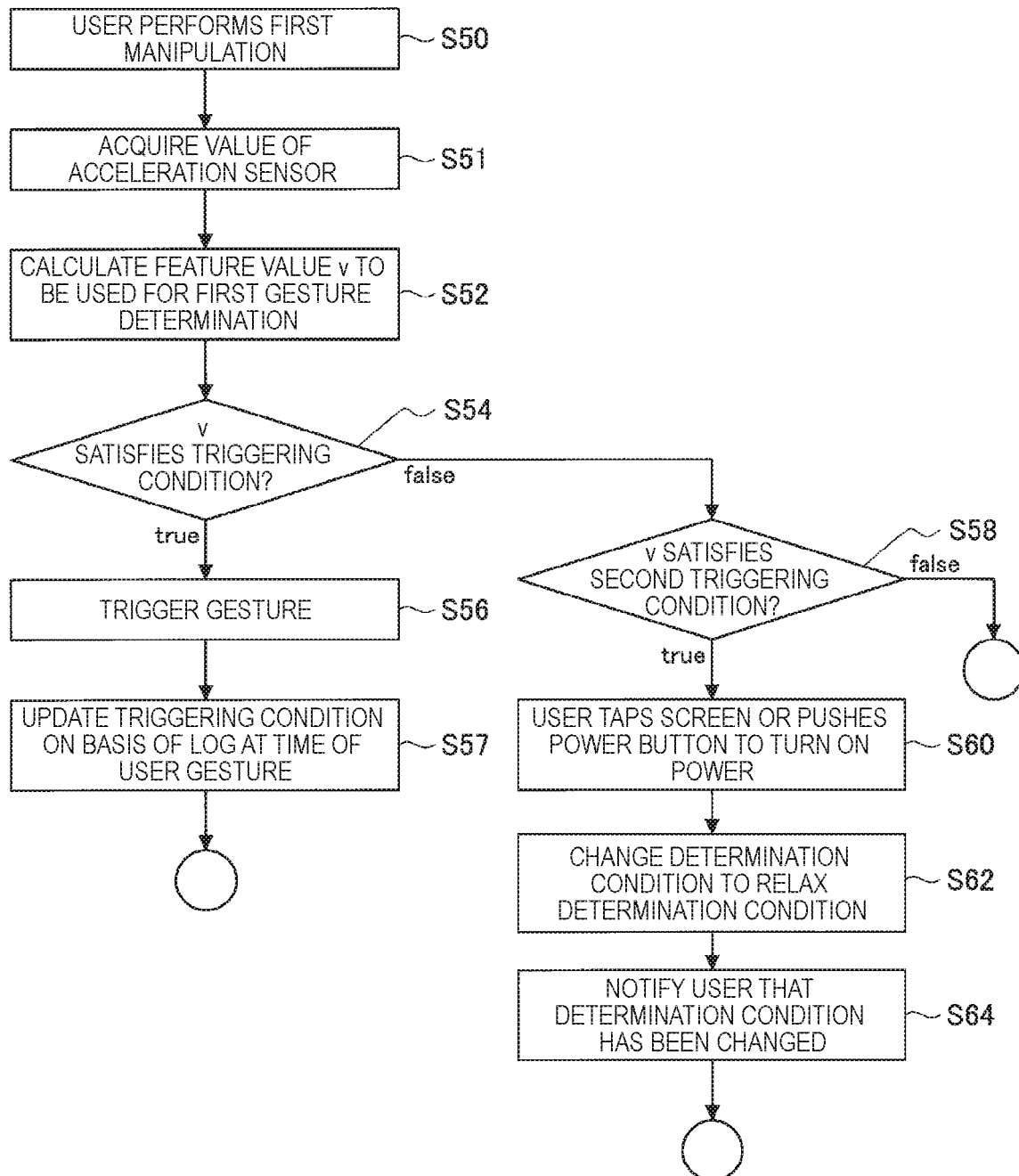
FIG. 9 is a flowchart illustrating an example in which a threshold value of a triggering condition is changed in accordance with a swing-up action of a user of a terminal device.

In the case where the gesture of swinging up an arm described above is performed, there are individual differences in the strength of the swing-up action among users. In other words, gesture manipulation involves an individual difference between, for example, a user whose motion is clear and a user whose motion is weak. However, it is difficult to initially customize the terminal device 100 in accordance with differences between individual users; hence, a gesture reaction function is changed to match the user on the basis of manipulation logs during use. FIG. 9 is a flowchart illustrating processing of changing the gesture reaction function.

First, in step S50, the user performs a first manipulation. Here, the first manipulation corresponds to an action of swinging up an arm. Next, in step S51, a detection value of the acceleration sensor 104 is acquired. In next step S52, a feature value v to be used for first gesture determination is calculated. In next step S54, it is determined whether the feature value v satisfies a gesture triggering condition, and in the case where the gesture triggering condition is satisfied, the processing advances to step S56 and a gesture is triggered. Cases where the gesture is triggered in step S56 include a case where the condition of step S54 has been satisfied with a great margin and a case where the condition has been satisfied with a slight margin. In the former case, the user seems to tend to perform a clear gesture, and in the latter case, the user seems to tend to perform a gesture with a weak motion. Hence, the processing advances to step S57 after step S56, and the determination function used in step S54 is updated on the basis of information indicating whether the condition of step S54 has been satisfied with a great margin or the condition has been satisfied with a slight margin. This changing is performed every time or each time a certain number of logs are accumulated.

On the other hand, in the case where the feature value v does not satisfy the gesture triggering condition in step S54, the processing advances to step S58. In step S58, it is determined whether the feature value v satisfies a second triggering condition, and in the case where the second triggering condition is satisfied, the processing advances to step S60. The second triggering condition is a condition more relaxed than the first triggering condition. On the other hand, in the case where the second triggering condition is not satisfied in step S58, the processing is ended.

In step S60, since a gesture is not triggered, the user performs a manipulation equivalent to a manipulation that has been tried to be achieved by a gesture, by tapping the screen, manually manipulating a power button to turn on the power of the terminal device 100, etc. In the case where this manipulation is performed, it seems that the original gesture manipulation performed in step S50 has been intended by the user and should have been triggered. Therefore, in step S62, the determination function used in step S54 is updated to be relaxed. In next step S64, the user is notified by screen display that the determination function has been updated.

As described above, according to the flowchart of FIG. 9, in the case where the first manipulation is not triggered, when the user achieves a desired manipulation by pushing the power button to start up the terminal device 100, for example, a threshold value for determining gesture triggering can be changed from the next time. Consequently, even in the case where there are individual differences in the strength of an action among users, the determination condition (threshold value) for gesture triggering can be adjusted optimally. In addition, after the determination condition is adjusted as described above, the determination condition can be reset to the original value. Resetting of the determination condition is performed by the threshold value determination unit 218 of the sensor monitoring module 230 and the gesture determination module 240. For example, resetting can be performed in the case where there is a user reset manipulation, the case where an application is changed, the case where a different meaning is set for the same gesture, the case where an owner is changed, the case where information of high airtightness and importance comes to be displayed after gesture triggering, and the like.

[2.2. Changing Gesture Recognition Function According to Notification]

Next, changing a gesture recognition function according to notification is described. As described above, the terminal device 100 has an e-mail function. When a message arrives via e-mail, the user is more likely to try to start up the terminal device 100 by a swing-up action. Therefore, in the second embodiment, in gesture triggering by swing-up, a gesture triggering determination function is changed by using information of arrival of a message.

Specifically, during a certain period of time from arrival of a message at the terminal device 100 and notification of this arrival to the user by vibration, a determination condition for an arm swing-up gesture is relaxed, so that a motion that usually does not cause a reaction is reacted to as swing-up. Thus, in the case where the user swings up an arm to check the message within this certain period of time, the screen can be lit easily and a desired manipulation such as message viewing can be achieved.

Figure 12A:
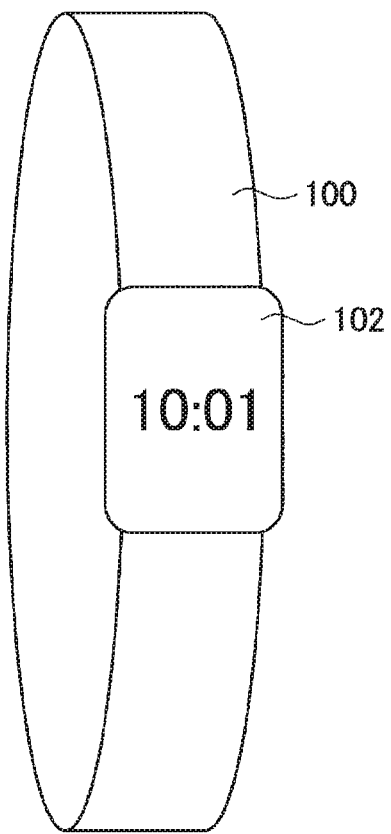
FIG. 12A is a schematic diagram illustrating operation when a message arrives at a terminal device.
Figure 12B:
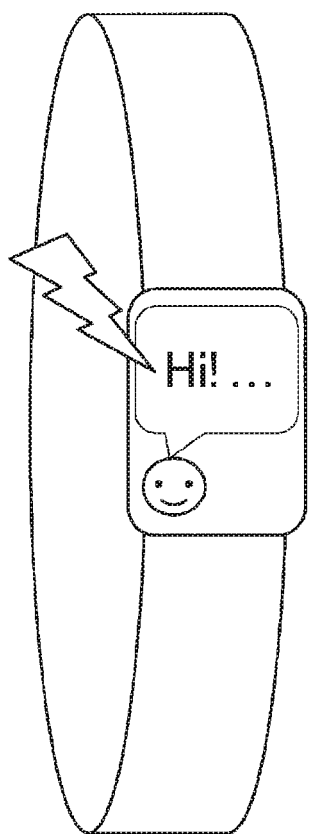
FIG. 12B is a schematic diagram illustrating operation when a message arrives at a terminal device.
Figure 12C:
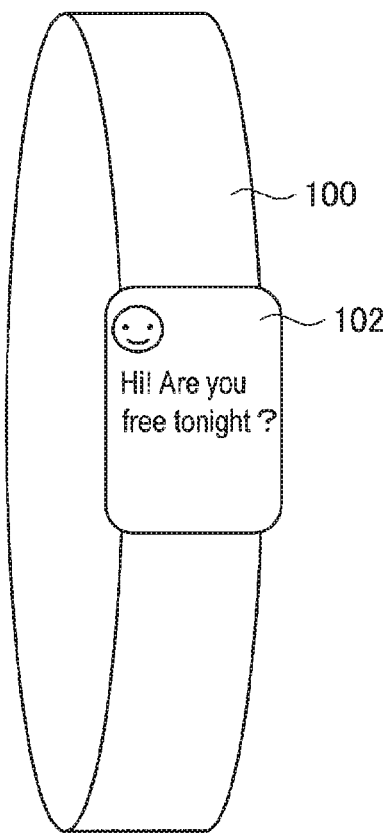
FIG. 12C is a schematic diagram illustrating operation when a message arrives at a terminal device.
Figure 12D:
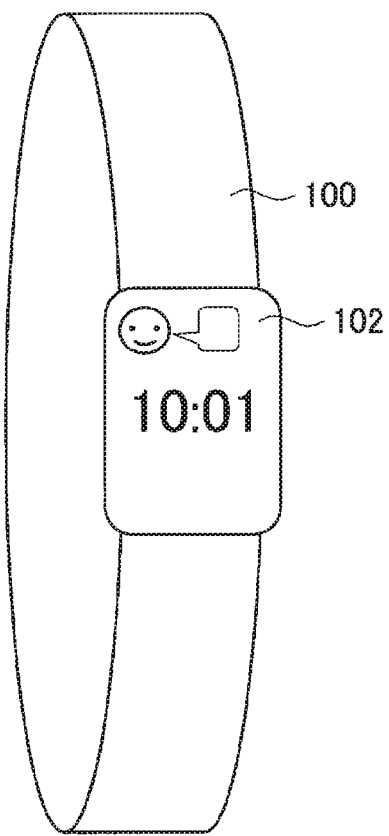
FIG. 12D is a schematic diagram illustrating operation when a message arrives at a terminal device.

FIGS. 12A, 12B, 12C, and 12D are schematic diagrams illustrating operation when a message arrives at the terminal device 100. FIG. 12A illustrates normal display, and a time is displayed on the display unit 102 in this state. When a message arrives at the terminal device 100, as illustrated in FIG. 12B, part of the message is displayed on the screen of the display unit 102, together with vibration caused by the vibrator 107, to notify the user that the message has arrived. Next, the user swings up an arm or taps the screen, so that the state transitions to a state illustrated in FIG. 12C, and the user can check details of the message. On the other hand, in the case where the user does not swing up an arm or tap the screen for a certain period of time and the state is left in a state illustrated in FIG. 12B, the screen transitions to a state of FIG. 12D and returns to clock display, and a simple notification icon is displayed.

Figure 13:
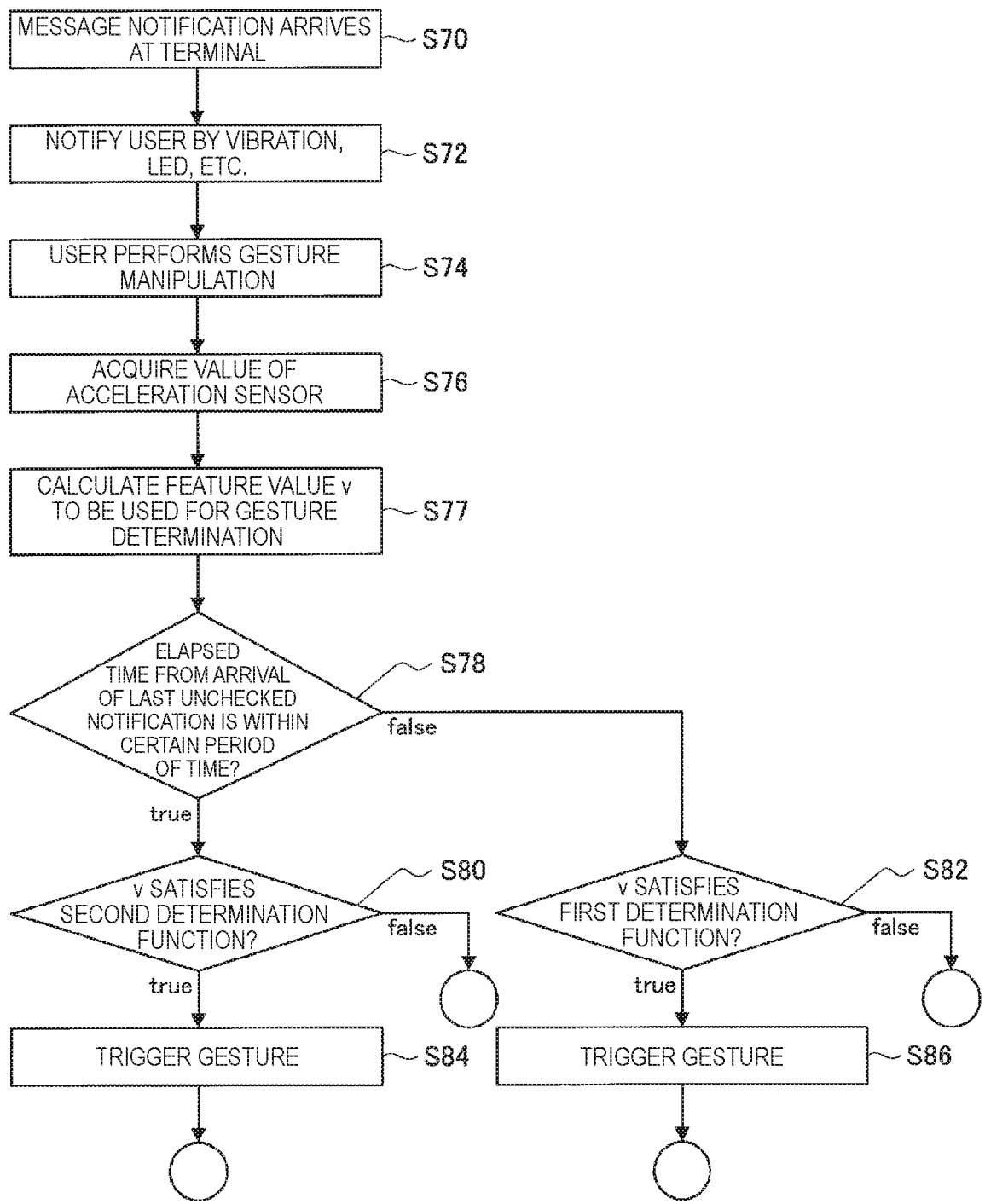
FIG. 13 is a flowchart illustrating processing in a second embodiment.

FIG. 13 is a flowchart illustrating processing in the second embodiment. First, in step S70, a message to the user of the terminal device 100 arrives. In next step S72, a system of the terminal device 100 notifies the user by screen display, LED lighting, vibration, or the like to tell the user that the message has arrived. In next step S74, the user performs a swing-up gesture to check the terminal device 100. In next step S76, a detection value of the acceleration sensor 104 is acquired, and in next step S77, a feature value v to be used for gesture determination is calculated.

In step S78, it is checked whether a certain period of time has elapsed from arrival of the last unchecked notification, and in the case where there is an unchecked notification within the certain period of time, the processing advances to step S80, and gesture swing-up is determined using a second determination function with a determination condition more relaxed than a normal condition. As a result, when the swing-up is determined to be a gesture, the screen is lit (step S84). At this time, information indicating that a message has arrived is transmitted to the microcomputer 110 from the wireless communication unit 124, and the determination condition is changed by the threshold value determination unit 218 of the sensor monitoring module 230 and the gesture determination module 240 of the microcomputer 110. The processing unit 220 performs gesture triggering in accordance with the change in the determination condition, and lights the display unit 202. In addition, the processing unit 220 outputs a result of gesture triggering to the display module and various applications. That is, the processing unit 220 also functions as an output unit that outputs a result of gesture triggering. Note that a time at which an unchecked notification has been acquired is a time related to acquisition of the unchecked notification, and includes both a reception time of the message itself and a notification timing after reception of the message.

On the other hand, in the case where a certain period of time has elapsed in step S78, the processing advances to step S82, and swing-up is determined using a first determination condition, which is normal. As a result, when the swing-up is determined to be a gesture, the screen is lit (step S86).

In this manner, in the case where the user tries to check a message after notification of the message, the second determination function with a determination condition more relaxed than the normal condition is applied, which reduces the possibility of the user failing in swing-up, and improves convenience and availability.

In step S78, conditions used for selection of a determination function include the following elements, in addition to message arrival.

(1) Message contents: in the case where the message is addressed to a specific person, the determination function is relaxed as urgent notification. In the case of an advertisement mail, the determination function is not relaxed (made stricter).

(2) Incoming call and alarm: in the case where an arm is swung up while there is an incoming call, the determination function is relaxed. The determination function is relaxed also when an alarm is ringing.

(3) Personal information of user: for example, the determination function is changed in accordance with an age or a length of an arm.

(4) Environmental information: for example, the determination condition is changed in accordance with weather.

(5) Schedule, position, and activity: as a result of activity analysis determined from a schedule, a GPS, and the acceleration sensor 104, the determination function is not relaxed (made stricter) during movie appreciation, for example. The determination function is relaxed during movement, between plans, or around the end of a plan. The determination function is not relaxed at midnight. The determination function is relaxed in the morning. For example, if a time to take a train, an opening time of a meeting, and the like are registered in the terminal device 100 in advance, the user is more likely to swing up an arm to see the display screen on the display unit 102 before that time. Hence, relaxing the gesture determination function enables lighting reliably when the user swings up an arm before the time to take the train or the meeting opening time.

(6) Application and scene: For the same gesture, the determination function is changed depending on the importance of the manipulation. For example, in the case of manipulating a button for sending a message with a finger tap, the determination function is made stricter, because wrong transmission will bring about a serious problem. Also in the case of a manipulation of deleting a message or a plan, the determination function is made stricter. On the other hand, for a manipulation of marking a notification as read, the determination function is relaxed, because it is performed frequently and is not of high importance. In addition, in the case where the application is a game with vigorous motion, the determination function is made stricter to make gesture triggering difficult. Moreover, the determination function is changed in accordance with a situation of the game.

(7) Activity history and gesture triggering history of user: in accordance with a position, time, a day of week, etc., the determination function is relaxed for a place, time, and day of week having a history of the user seeing the screen.

(8) Specifications of terminal device: for example, in accordance with a weight of the terminal device 100, the determination function is made stricter for a lighter terminal device because it is easier to swing up an arm.

(9) State of battery: in the case where the remaining battery power is low, the display screen can be made difficult to light by making the gesture determination condition stricter, which can suppress a decrease in remaining battery power.

Note that in the display in step S72, display (UI) showing the user that gesture recognition is made easier may be performed. In addition, a period from the determination in step S78 to the advance to step S80 in which the second determination function is applied corresponds to the period of FIG. 12B, and the user can be aware that a gesture is invoked by simple swing-up in this period.

[2.3. Changing LP Filter According to Activity of User]

Next, changing an LP filter according to an activity of the user is described. In order to perform gesture determination with high precision, it is necessary to separate a manipulation in which the user has intentionally performed a gesture from other manipulations. For this separation, the motion noise removal unit 214 can be used. Since the low-pass filter can absorb stationary noise, wrong gesture triggering during motion can be prevented, but the application of the filter causes delay and makes it relatively difficult to cause a reaction immediately after a manipulation. For example, a cutoff frequency of the filter of the motion noise removal unit 214 is made lower in the case where the user is during motion such as walking or running, and the cutoff frequency is made higher or the use of the low-pass filter itself is quit when there is less motion, such as when sitting. In this manner, a gesture can be triggered with less latency during stop, while preventing wrong gesture triggering during motion.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire manipulation information based on a gesture manipulation of a user; and a determination unit configured to determine that processing is to be performed on a basis of the manipulation information, in which the determination unit determines that first processing is to be performed in a case where first manipulation information based on a first user manipulation is acquired, and that the first processing is to be performed, on a basis of acquired usage information of the user, in a case where second manipulation information based on a second user manipulation related to the first user manipulation is acquired.

(2)

The information processing device according to (1), in which the first user manipulation and the second user manipulation are similar to each other.

(3)

The information processing device according to (1) or (2), including an output unit configured to output a result of determination by the determination unit.

(4)

The information processing device according to any one of (1) to (3), in which a condition for determining that the first user manipulation has been performed is relaxed on the basis of the usage information of the user.

(5)

The information processing device according to (4), in which the condition for determining that the first user manipulation has been performed is relaxed within a predetermined period of time from a time related to acquisition of the usage information of the user.

(6)

The information processing device according to (4), in which the condition for determining that the first user manipulation has been performed is relaxed within a predetermined period of time from a time related to acquisition of received message information.

(7)

The information processing device according to any one of (1) to (6), in which the usage information is personal information about the user.

(8)

The information processing device according to any one of (1) to (6), in which the usage information is message information received by a communication unit.

(9)

The information processing device according to any one of (1) to (6), in which the usage information includes at least one of a schedule, a gesture triggering history, an age, and a length of an arm of the user.

(10)

The information processing device according to any one of (1) to (6), in which the usage information is information dependent on a usage environment of the user.

(11)

The information processing device according to any one of (1) to (6), in which the usage information is information dependent on the own device.

(12)
The information processing device according to any one of (1) to (6), in which the usage information is information dependent on an application used by the user.
(13)
The information processing device according to any one of (1) to (12), in which the determination unit changes a threshold value for determining that the first user manipulation has been performed, in response to acquisition of the usage information of the user.
(14)
The information processing device according to claim 13, in which the determination unit changes the threshold value in a case where the first user manipulation is performed within a predetermined period of time from a time related to the acquisition of the usage information.
(15)
The information processing device according to any one of (1) to (14), in which the determination unit dynamically changes a threshold value for determining that the first user manipulation has been performed.
(16)
The information processing device according to (15), in which the determination unit changes the threshold value each time the first user manipulation is performed.
(17)
The information processing device according to any one of (1) to (16), in which the gesture manipulation is a non-contact manipulation.
(18)
The information processing device according to any one of (1) to (17), including
a display unit,
in which the first processing is processing of causing the display unit to display information.
(19)
An information processing method including:
acquiring manipulation information based on a gesture manipulation of a user; and determining that processing is to be performed on a basis of the manipulation information,
in which it is determined
that first processing is to be performed in a case where first manipulation information based on a first user manipulation is acquired, and
that the first processing is to be performed, on a basis of acquired usage information of the user, in a case where second manipulation information based on a second user manipulation related to the first user manipulation is acquired.
(20)
A program causing a computer to function as:
a means of acquiring manipulation information based on a gesture manipulation of a user; and
a means of determining that processing is to be performed on a basis of the manipulation information,
in which the program causes the computer to function as a means of determining
that first processing is to be performed in a case where first manipulation information based on a first user manipulation is acquired, and
that the first processing is to be performed, on a basis of acquired usage information of the user, in a case where second manipulation information based on a second user manipulation related to the first user manipulation is acquired.

REFERENCE SIGNS LIST

212 sensor monitoring module
218 threshold value determination unit
220 processing unit
240 gesture determination module

The invention claimed is:
1. An information processing device, comprising:
at least one processor configured to:
acquire first manipulation information based on a first gesture manipulation of a user;
acquire second manipulation information based on a second gesture manipulation of the user;
notify usage information to the user;
determine a trigger corresponding to one of the first manipulation information or the second manipulation information, wherein
the trigger, corresponding to the first manipulation information, is determined when a time period, elapsed from the notified usage information unchecked by the user, is outside a threshold period of time,
the trigger, corresponding to the second manipulation information, is determined when the time period, elapsed from the notified usage information unchecked by the user, is within the threshold period of time, and
the second gesture manipulation is associated with the first gesture manipulation; and
execute a process based on the trigger.
2. The information processing device according to claim 1, wherein the first gesture manipulation is similar to the second gesture manipulation.
3. The information processing device according to claim 1, wherein the at least one processor is further configured to output a result of determination of the execution of the process.
4. The information processing device according to claim 1, wherein
the trigger corresponding to the first gesture manipulation is determined based on a first condition,
the trigger corresponding to the second gesture manipulation is determined based on a second condition, and
the second condition is relaxed than the first condition, based on the usage information.
5. The information processing device according to claim 4, wherein the second condition for the determination of the trigger corresponding to the second gesture manipulation is relaxed within the threshold period of time.
6. The information processing device according to claim 4, wherein
the at least one processor is further configured to receive message information as the usage information, and
the second condition for the determination of the trigger corresponding to the second gesture manipulation is relaxed within the threshold period of time.
7. The information processing device according to claim 1, wherein the usage information is personal information about the user.
8. The information processing device according to claim 1, wherein the at least one processor is further configured to acquire the usage information as message information.
9. The information processing device according to claim 1, wherein the at least one processor is further configured to determine the trigger corresponding to the second manipulation information based on at least one of a schedule, a gesture triggering history, an age, or a length of an arm of the user.
10. The information processing device according to claim 1, wherein the at least one processor is further configured to determine the trigger corresponding to the second manipulation information based on information of a usage environment of the user.

11. The information processing device according to claim 1, wherein the at least one processor is further configured to determine the trigger corresponding to the second manipulation information based on information of a device associated with the user.

12. The information processing device according to claim 1, wherein the at least one processor is further configured to determine the trigger corresponding to the second manipulation information based on information of an application associated with the user.

13. The information processing device according to claim 1, wherein the at least one processor is further configured to change a threshold value for the determination of the trigger based on the notification of the usage information.

14. The information processing device according to claim 13, wherein the at least one processor is further configured to change the threshold value based on the acquisition of the second manipulation information within the threshold period of time.

15. The information processing device according to claim 1, wherein the at least one processor is further configured to dynamically change a threshold value for the determination of the trigger.

16. The information processing device according to claim 15, wherein the at least one processor is further configured to change the threshold value each time of the acquisition of the first manipulation information.

17. The information processing device according to claim 1, wherein the first gesture manipulation and the second gesture manipulation are a non- contact manipulation with respect to the information processing device.

18. The information processing device according to claim 1, further comprising a display device, wherein the execution of the process corresponds to control of the display device to display specific information.

19. An information processing method, comprising:
acquiring first manipulation information based on a first gesture manipulation of a user;
acquiring second manipulation information based on a second gesture manipulation of the user;
notifying usage information to the user;
determining a trigger corresponding to one of the first manipulation information or the second manipulation information, wherein
the trigger, corresponding to the first manipulation information, is determined when a time period, elapsed from the notified usage information unchecked by the user, is outside a threshold period of time,
the trigger, corresponding to the second manipulation information, is determined when the time period, elapsed from the notified usage information unchecked by the user, is within the threshold period of time, and
the second gesture manipulation is associated with the first gesture manipulation; and
executing a process based on the trigger.

20. A non-transitory computer-readable medium having stored thereon computer-executable instructions, which when executed by at least one processor of an information processing device, cause the at least one processor to execute operations, the operations comprising:
acquiring first manipulation information based on a first gesture manipulation of a user;
acquiring second manipulation information based on a second gesture manipulation of the user;
notifying usage information to the user;
determining a trigger corresponding to one of the first manipulation information or the second manipulation information, wherein
the trigger, corresponding to the first manipulation information, is determined when a time period, elapsed from the notified usage information unchecked by the user, is outside a threshold period of time,
the trigger, corresponding to the second manipulation information, is determined when the time period, elapsed from the notified usage information unchecked by the user, is within the threshold period of time, and
the second gesture manipulation is associated with the first gesture manipulation; and
executing a process based on the trigger.

* * * * *